(12) United States Patent
Finlay et al.

(10) Patent No.: US 12,458,273 B2
(45) Date of Patent: Nov. 4, 2025

(54) COMPUTER IMPLEMENTED METHOD AND SYSTEM FOR AIDING MAPPING HEART RHYTHM ABNORMALITIES

(71) Applicant: Rhythm AI Ltd, London (GB)

(72) Inventors: Malcolm Finlay, London (GB); Richard Schilling, London (GB); Xinwei Shi, San Diego, CA (US); Michael McGovern, Seattle, WA (US)

(73) Assignee: Rhythm AI Ltd, London (GB)

( * ) Notice: Subject to any disclaimer, the term of this patent is extended or adjusted under 35 U.S.C. 154(b) by 0 days.

(21) Appl. No.: 18/431,214

(22) Filed: Feb. 2, 2024

(65) Prior Publication Data

US 2024/0407704 A1    Dec. 12, 2024

(30) Foreign Application Priority Data

Jun. 6, 2023 (GB) ...................................... 2308431

(51) Int. Cl.
| | |
|---|---|
| *A61B 5/367* | (2021.01) |
| *A61B 5/00* | (2006.01) |
| *A61B 5/287* | (2021.01) |
| *A61B 5/343* | (2021.01) |
| *A61B 5/364* | (2021.01) |
| *G16H 10/60* | (2018.01) |

(52) U.S. Cl.
CPC .............. *A61B 5/367* (2021.01); *A61B 5/343* (2021.01); *A61B 5/364* (2021.01); *A61B 5/743* (2013.01); *G16H 10/60* (2018.01); *A61B 5/287* (2021.01)

(58) Field of Classification Search
CPC ......... A61B 5/367; A61B 5/364; A61B 5/343; A61B 5/743; A61B 5/287; G16H 10/60
See application file for complete search history.

(56) References Cited

U.S. PATENT DOCUMENTS

| | | |
|---|---|---|
| 2019/0188909 A1 | 6/2019 | Yellin et al. |
| 2020/0060567 A1 | 2/2020 | Zeidan et al. |

(Continued)

FOREIGN PATENT DOCUMENTS

| | | |
|---|---|---|
| EP | 3225161 A1 | 10/2017 |
| WO | 2018190716 A1 | 10/2018 |

OTHER PUBLICATIONS

International Search Report and Written Opinion for corresponding PCT Application No. PCT/GB2024/051460 dated Sep. 10, 2024 (14 pages).

(Continued)

*Primary Examiner* — Michael W Kahelin
(74) *Attorney, Agent, or Firm* — Leason Ellis LLP

(57) ABSTRACT

A computer program and system are described that support identification of regions of the heart responsible for supporting or initiating abnormal heart rhythms. Electrode activation sequences contributing to a repetitive pattern of activation are identified. An earliest activating site, a vector of activation from the identified electrode activation sequences and a path back from the earliest activating site over a surface of the heart chamber are determined. A statistical measure is computed for the repetitive pattern of activation and data identifying the repetitive pattern of activation including the path is output, the data varying the prominence of the repetitive pattern of activation in dependence on the statistical measure.

20 Claims, 7 Drawing Sheets

(56) References Cited

U.S. PATENT DOCUMENTS

2020/0359924 A1* 11/2020 Finlay .................... A61B 5/316
2021/0059550 A1    3/2021 Urman et al.
2021/0369179 A1   12/2021 Cheng et al.
2022/0054070 A1*  2/2022 Honarbakhsh ......... A61B 5/742

OTHER PUBLICATIONS

Search Report for corresponding GB Application No. GB2308431.2 dated Nov. 27, 2023 (2 pages).

* cited by examiner

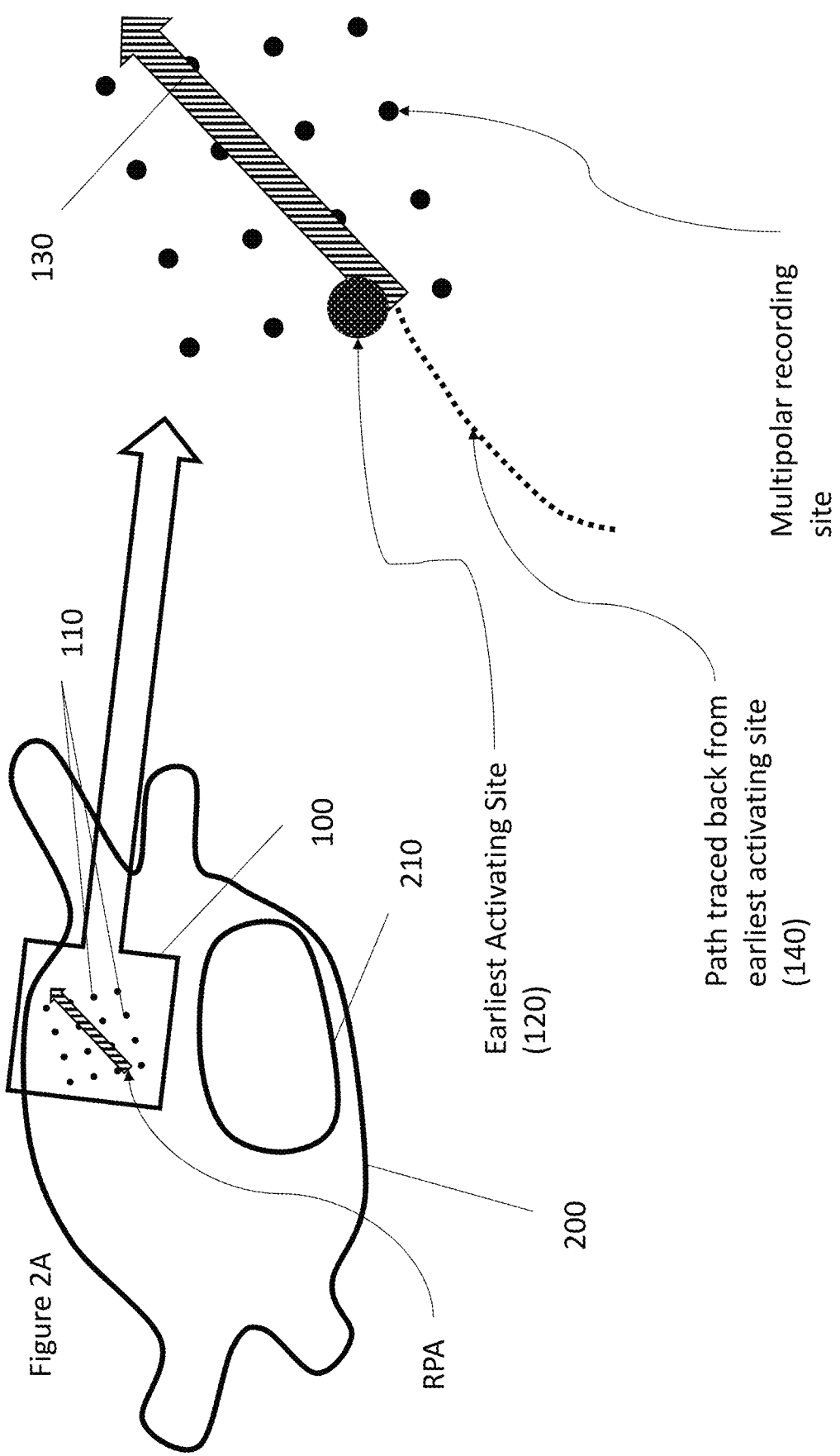

COMPUTER IMPLEMENTED METHOD AND SYSTEM FOR AIDING MAPPING HEART RHYTHM ABNORMALITIES

CROSS-REFERENCE TO RELATED APPLICATION

This application claims priority to UK Patent Application No. 2308431.2 filed Jun. 6, 2023, which is hereby incorporated by reference in its entirety.

FIELD OF THE INVENTION

The present invention relates to a computer implemented method and system for aiding mapping heart rhythm abnormalities and in particular to methods and systems to identify areas of the heart that are statistically likely to be driving abnormal heart rhythms.

BACKGROUND TO THE INVENTION

The present application is related to the earlier co-pending applications Publication Nos. WO 2019/206908 and WO 2021/084255, the contents of which are hereby incorporated by reference. These applications describe systems and methods for Stochastic Trajectory Analysis of Ranked Signals (STAR) mapping which is referenced below. While embodiments may use STAR mapping, as discussed below other approaches are also possible.

Atrial fibrillation (AF) is the most common sustained heart rhythm abnormality. Its incidence is increasing partly due to the aging population and it has been referred to as a growing epidemic. AF results in irregular contractions of the heart causing unpleasant symptoms of palpitations and increasing the risk of stroke, heart failure (HF) and death. Percutaneous catheter ablation (CA) is a safe treatment option in symptomatic patients with AF. The success rate of these procedures has improved with time due to the better understanding of AF, development of new techniques and technology, and greater physician experience. However, the success rate of these procedures still only remains between 50 and 70%. A major reason for the difficulties found in targeting the specific sites responsible for the persistence and maintenance of AF (hereafter referred to as AF drivers) is the irregular and chaotic nature of activation wavefronts in atrial fibrillation. The constant meandering and instability of individual rotational, re-entry or focal activations makes interpretations of activation sequences very complex.

Mapping of ventricular tachycardias may present similar challenges. Frequently VT is too rapid to allow comprehensive point-by-point mapping using even automated systems. Further, cycle lengths can vary and multiple VT circuits may exist in a single patient with each circuit contributing at different times. Interpretation of point-by-point maps, or even maps acquired in rapid tachycardias can be challenging, and the acquisition of these maps is often impossible if the patient cannot maintain an adequate blood pressure to allow wide progressive mapping of points around the heart.

More recently, a number of computational and electro-anatomical methods have been developed allowing electrical data (i.e. electrograms) recorded from within the atria to be presented to the physician in such a way that particular "driver" areas might be recognized. These drivers might also be easier or harder to recognize depending on the relationship between the frequency of the driver and the frequency of activations from non-driver random and chaotic activity. Panoramic mapping techniques attempt to address this issue. Here, multipolar catheters are inserted into the cardiac chamber of interest and the signals from across the chamber are acquired simultaneously. Examples of this include non-contact mapping (Ensite, Abbott Medical; alternatively Acutus Medical), and particular 2D and 3D contact mapping methods (e.g. Cartofinder, Biosense Webster, J&J; Topera, Abbott Medical; Rhythmia, Boston Scientific).

Evidence is conflicting as to whether electrogram characteristics are useful as surrogate markers for localized drivers in persistent AF in humans. These may be termed atrial fibrillation drivers (AFD)s. It is understood that a single AFD may give rise to a regular, non-fibrillatory arrhythmia, therefore AFD may be taken to indicate an Atrial Fibrillation/Arrhythmia Driver. Whilst features of organization of electrograms have better identified sites that play a mechanistic role in AF, markers of rapidity have been less reliable. Optical mapping studies in animals have shown that AF is maintained by sites demonstrating fastest cycle lengths (CL) and highest dominant frequency (DF), however, in humans this has proven to be a poor predictor of sites that support AF. The poor correlation may be because of the lack of spatiotemporal stability of drivers in AF, which may explain the apparent inconsistency of sites of rapidity. In addition, optical mapping studies in animals have shown intra-atrial high to low frequency gradients at rotor sites. Whilst frequency gradients have also been demonstrated in humans with AF these have been confined to inter-atrial gradients.

The STAR Mapping Method

The STAR mapping method has been described in detail in the above-mentioned patent applications and was validated by mapping in vitro and in vivo by mapping atrial tachycardias (AT) before being used to map AF. In brief, the principle of the STAR mapping method is to use electrogram data recorded from a plurality of electrodes on multipolar cardiac catheters obtained from a corresponding series of sensing locations on the heart over a recording time period. A comparison of timings of multiple electrograms is used to establish the individual wavefront trajectories associated with AF. This is then used to identify regions of the atrium that most often precede activation of neighboring areas. By gathering data from many activations, a statistical model can be formed. This permits regions of the atrium to be ranked according to the amount of time that activations precede those of adjacent regions. Unipolar activation timing is typically taken as the maximum negative deflection (peak negative dv/dt), however activation timings may be derived from other methods such as dipole density or peak bipolar or resolved omnipolar voltage. Through utilizing pre-defined refractory periods the mapping method avoids assigning activations from separate wavefronts or fractionated electrograms. Electrode timing relationships that are implausible due to conduction velocity restraints are also excluded by the mapping method.

One form of a STAR map display consists of color-coded electrode positions projected on to a replica of the patient's atrial geometry created in a standard 3D mapping system. Each color represents the proportion of time the electrode spends leading in relation to the other paired electrodes as highlighted by the color scale on the right-hand side of the STAR maps.

One of the implementations of the STAR mapping method allows for predominant vectors of activation over an area to be calculated. In brief, for each activation detected on roving catheter electrodes (for example, the HDgrid™ (Abbott), or Pentarray™ or Octarray™ (Biosense Webster, J&J) the activation sequence is recorded. This activation sequence allows an averaged "best fit" vector of activation to be calculated. When many separate activations are recorded over a period of time in one location, a plethora of activation vectors are calculated. These activation vectors can be classified by features such as rate, activation sequence, leading electrode, electrogram morphology, activation sequence recorded by electrodes on catheters in stable positions, or by reference to the surface electrocardiogram. When an electrode activation sequence occurs in a similar pattern in a repetitive manner, these can be termed repetitive patterns of activation. (RPA) s, i.e. an RPA is the averaged vector of a series of activations that have been classified as similar by one or more features. Each RPA features a vector and there may be derived features and statistical measures from the sequences or raw data which are used to calculate a RPA, such as the component vectors, rates and morphologies.

Problem with Current Methodology

Mapping systems that seek to identify the proportion of times an electrode is "leading" in relation to its adjacent electrodes can be used to produce a global distribution of ranked sites which are potential AF drivers (AFDs) when using a basket to map the atria. A similar process may be undertaken for other arrhythmias e.g. in the ventricle or atrial tachycardias. However, for mapping techniques using a high density multipolar catheter to record data sequentially at a number of different locations around the cardiac chamber, no information is provided as to the relative importance of the early sites among these recordings. For instance, a number of sites might all be seen to be leading from different acquisitions.

A further problem with analysis of acquired data with a high-density multipolar catheter relates to the complexity of interpretation of sites designated as leading on the edge of an acquisition area.

Early site activation or potential driver sites are challenging to identify using these local recordings. This is especially the case if the sites happen to be in an area where the recordings have not been made, or these sites are on the border of the multipolar catheter. The interpretation of multiple vectors of activation to better indicate areas which require further mapping, or are potential ESAs, is challenging. A system that enables a visual indication of areas of the heart where mapping would be particular beneficial would simplify and speed-up cardiac mapping procedures.

There are particular advantages to using a statistical method over many activations to determine the principal vectors of activation from which a back track region can be calculated. Firstly, even in "regular" tachycardias, subtle variations in vectors of activations commonly occur. These may be more pronounced if an ectopic beat arises outside a tachycardia circuit, but does not break the tachycardia. In this circumstance, if the ectopic is used to base a vector, an incorrect backtrack may be highlighted as it is based on only a single beat of tachycardia. This error could be exacerbated by the relatively small footprint of many multipolar mapping catheters, and provide the physician incorrect information as to RPA directions. Second, in arrhythmias with varying cycle lengths, classification of vectors by cycle length may cause over complexity of mapping. Thirdly, in disorganised arrhythmias such as atrial fibrillation, the summation of multiple vectors may be required to provide useful information on the principle vectors contributing to activation.

STATEMENT OF INVENTION

According to an aspect of the present invention, there is provided a computer program comprising computer program code means for performing a computer implemented method to identify one or more regions of the heart responsible for supporting or initiating abnormal heart rhythms when said computer program is executed on a computer, the computer implemented method using electrogram data recorded from a plurality of electrodes on multipolar cardiac catheters obtained from a corresponding series of sensing locations on the heart over a recording time period, the method including the steps of: obtaining data on the geometry of the heart from which the electrogram data was recorded;

identifying electrode activation sequences contributing over the recording time period to a repetitive pattern of activation from the electrogram data;

for each repetitive pattern of activation:

i) identifying the earliest activating site and a vector of activation from the identified electrode activation sequences;

ii) tracing a path back from the earliest activating site over a surface of the heart chamber, the surface being determined from the obtained data on the geometry of the heart, the path being cast as a ray over the surface of the heart chamber and guided by a vector that is opposite in direction to the vector of activation;

iii) calculating a statistical measure for said repetitive pattern of activation over said time period; and, iv) outputting data identifying the repetitive pattern of activation including the path, the data varying the prominence of the repetitive pattern of activation in dependence on the statistical measure.

The computer program may further comprise varying the prominence of the repetitive pattern of activation with respect to other repetitive patterns of activation.

The computer program may further comprise generating a visual representation of the surface of the heart chamber and of the repetitive pattern of activation traversing the path and being represented in dependence on its prominence.

The statistical measure may comprise frequency of repetition over the time period and/or consistency of activations over the time period in the direction of activation or some other statistical measure.

The visual representation of the repetitive pattern of activation may be varied by one of more of width of the path, color of the path, size and/or type of an indicator of the direction of activation.

The computer program may further comprise:

a) determining, for at least a selected repetitive pattern of action, for a point on said surface:

a distance across the surface from the point to the earliest point of activation for the repetitive pattern of activation;

a distance from the point to the nearest point on the path;

an angle between the earliest point of activation, the point and the nearest point on the path;

b) determining a score for the point in dependence on the distances and the angle;

c) varying the prominence of the point in the data that is output in dependence on the score.

The prominence of the point may be varied relative to a fixed scoring scale.

The prominence of the point may be varied relative to score of other points.

The computer program may further comprising performing steps a-c for all points on said surface.

The computer program may further comprise upon there being multiple repetitive patterns of activation, calculating a combined score for each point, the combined score being calculated in dependence on the scores for the respective point for the individual repetitive patterns of activation, step c) being performed in dependence on the combined score.

The computer program may further comprise the step of calculating the combined score comprising calculating a normalized score.

The step of calculating the combined score may comprise applying a penalty factor whereby scores are increased relative to how many repetitive patterns of activation the point contributes to.

Step a) may further include modifying one or more of the angle and distance measurement according to the statistical measure for the repetitive pattern of activation.

Step a) may further include accessing external data on the heart and modifying one or more of the angle and distance measurement or score according to the external data.

The external data may include voltage maps acquired earlier in a procedure, sites of known prior ablation, anatomical data or data regarding anatomy or physiology acquired from mapping databases.

The computer program may further comprise highlighting points where paths of repetitive patterns of activation intersect.

The data output may include data identifying the earliest activating site.

Embodiments of the present invention seek to apply an approach that enables back tracking from one or more stable contact recordings to find the earliest site of activation (ESA) or potential sources along the surface of one or more chambers of a subject's heart. A 3d geometric representation of the surface of a chamber (or chambers) of the subject's heart is imported and predominant vectors of activation on the surface of the chamber for repetitive patterns of activation (RPAs) are identified from received electrogram data. A repetitive patterns of activation (RPA) may be defined as a vector originating from the leading electrode position, following the summarized activation sequence for each atrial depolarization. Alternatively, other methods of vector of activation calculation are available. The importance of an individual RPA may be determined by its stability, rate or other features, typically a higher frequency RPA or a more consistent RPA would be ascribed a greater importance in the maintenance of AF. The level of importance can be represented with different visual properties of the RPA. For example, the thickness and color correlate to the frequency of RPA repetitions. The thicker it is, and the darker color it has, the more repetition of the RPA has. An arrow shape can also be used as an directional indicator of the consistency of the vector direction of each atrial depolarization. For example, the smaller the size of the arrow is, the less consistency the vector direction is.

In the WaveTrail method, a backtrack region is computed for each RPA. This backtrack region comprises an area on the chamber surface including regions where the activation pattern represented by the RPA may be plausibly have originated from, and therefore highlight areas that may warrant further investigation for consideration of treatment.

There are two factors the system of preferred embodiments considers when deciding if a point is a good candidate for inclusion in the backtrack region:

i) its distance from the location of the RPA recording location; and ii) the direction an activation would have to travel to reach the RPA recording location. To this end, two distances are preferably computed for points on the representation of the chamber surface: The distance from the RPA recording location and the distance from a geodesic curve extending back from the RPA recording location in the negative propagation direction.

A cut-off distance from the RPA recording location typically of similar size to a roving multipolar mapping catheter footprint size is used, for example the Abbott HD Grid™. The distance calculation is stopped beyond this point, and more distant points will not enter into the calculation. Preferably, measurement of the direction deviation is determined from the ratio of the distance to the geodesic: the distance to the source (for a flat surface that ratio would be the sin of the angle to the RPA direction).

The path back from the earliest activating site (backtrack path) and area around that path may also be processed to highlight further sensing locations to be investigated/recorded, the further sensing locations being indicative of earliest sites of activation or other drivers of abnormal heart rhythms. This feedback (an identified RPA and backtrack being used to select other areas not yet measured that should be mapped) results in a semi-autonomous process that is resource and time efficient and focuses on mapping relevant areas of the heart rather than taking random measurements or mapping entire areas. This process may be used to guide the clinician to focus on most likely locations of significance and narrow diagnostic action and/or highlight areas as candidates for ablation or other treatment.

BRIEF DESCRIPTION OF THE DRAWINGS

Embodiments of the present invention will now be described by way of example only and with reference to the accompanying drawings in which:

FIG. 2A is a schematic diagram illustrating aspects of operation of the method of FIG. 1;

DETAILED DESCRIPTION

Figure 1:
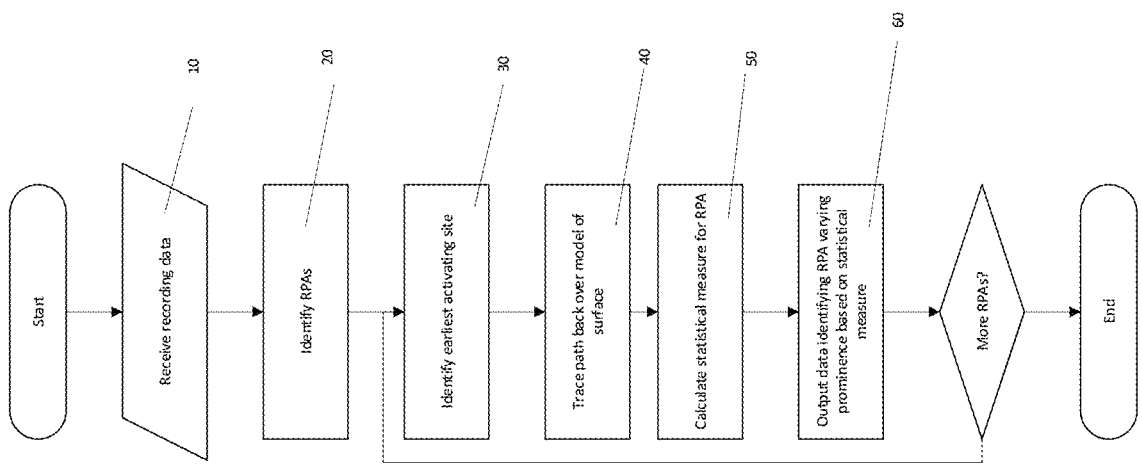
FIG. 1 is a flow diagram illustrating a computer implemented method according to an embodiment.

FIG. 1 is a flow diagram illustrating a computer implemented method according to an embodiment.

Figure 2B:
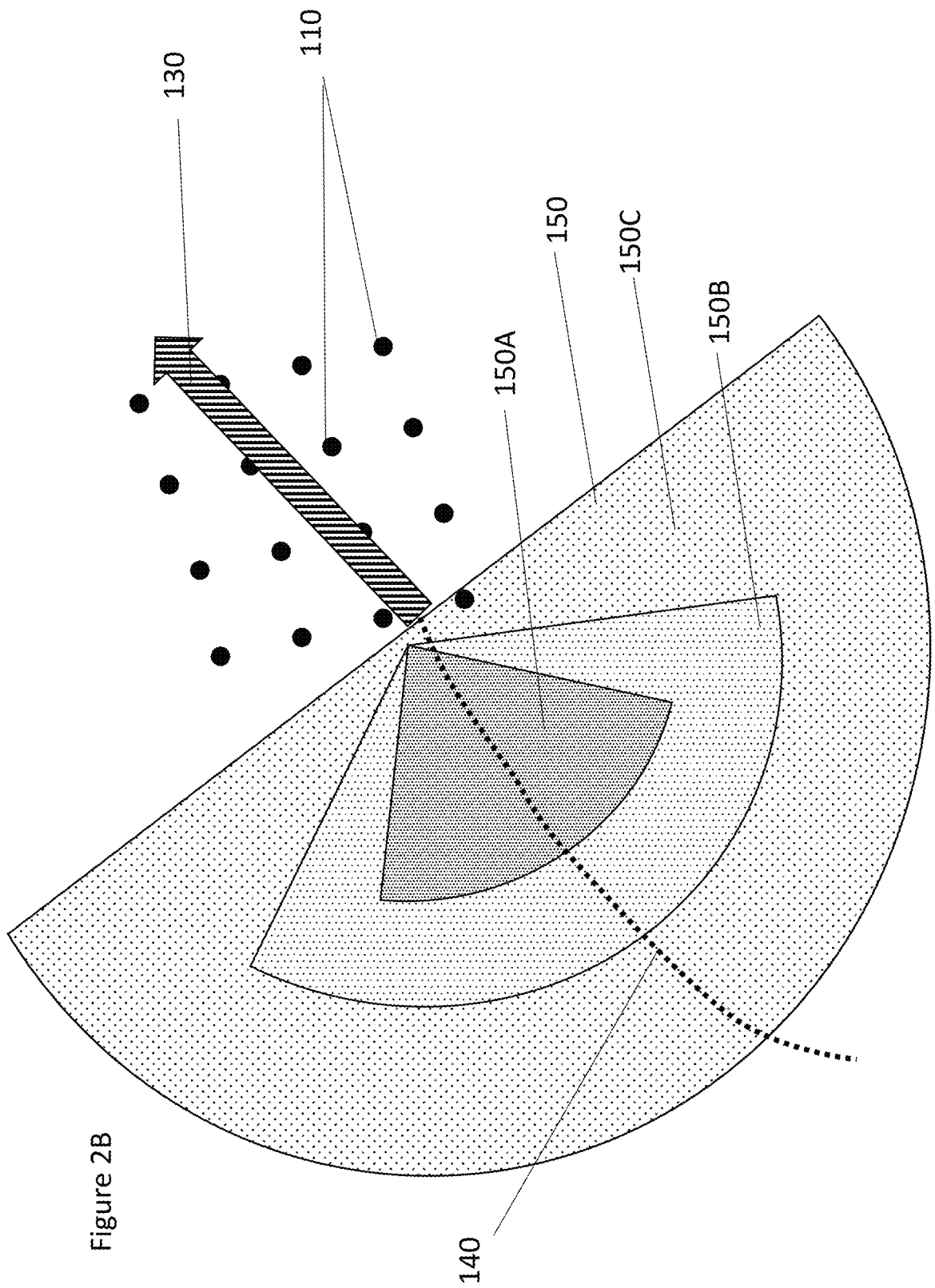
FIG. 2B is a schematic diagram illustrating further aspects of operation of the method of FIG. 1.
Figure 2C:
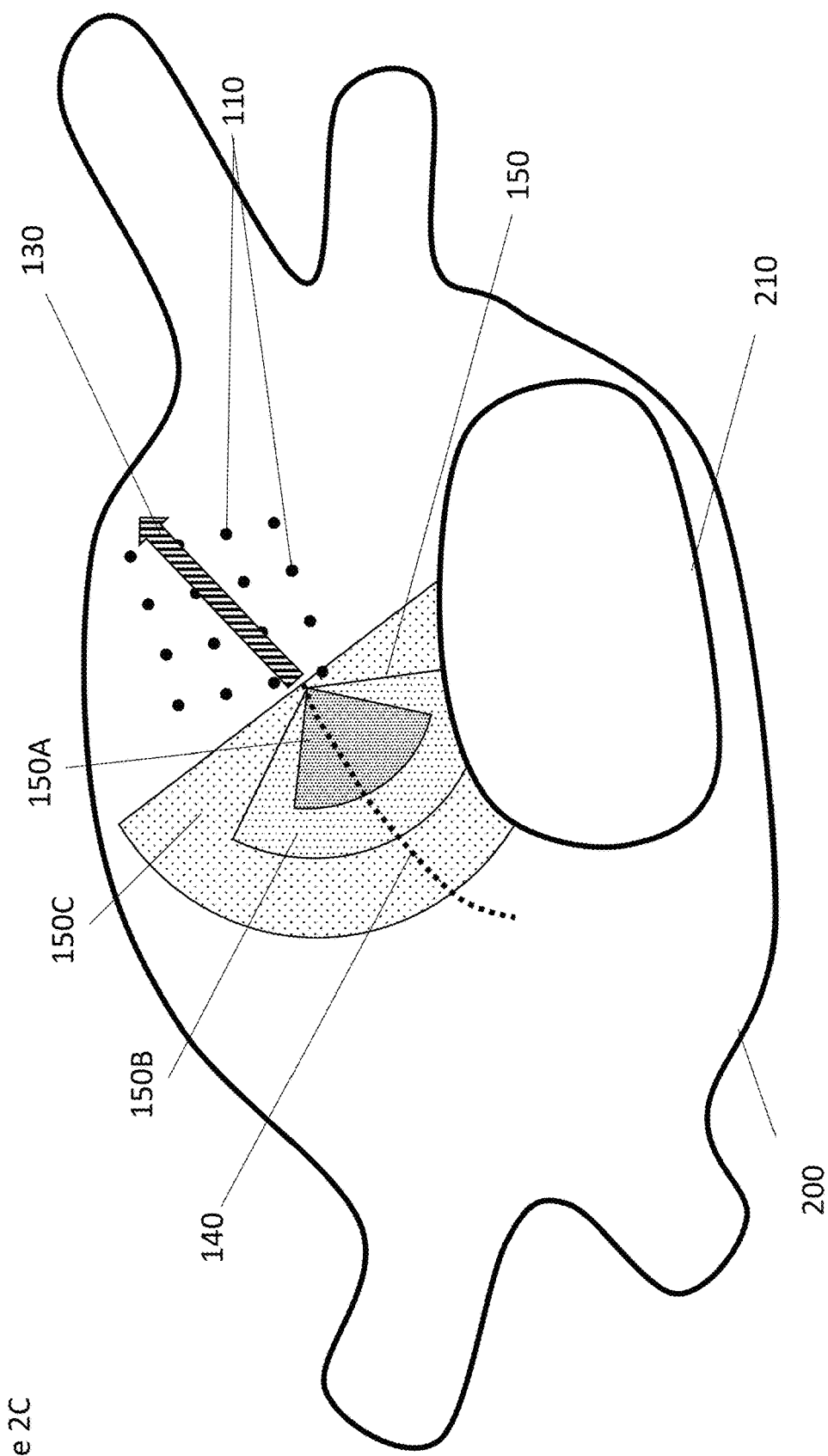
FIG. 2C is a schematic diagram illustrating the aspects FIGS. 2A and 2B combined in a display.

FIG. 2A is a schematic diagram illustrating aspects of operation of the method of FIG. 1. FIG. 2B is a schematic diagram illustrating further aspects of operation of the method of FIG. 1. FIG. 2C is a schematic diagram illustrating the aspects FIGS. 2A and 2B combined in a display.

In step 10, recording data is received. The recording data is preferably electrogram data recorded from a plurality of electrodes on multipolar cardiac catheters obtained from a corresponding series of sensing locations on the heart 200 over a recording time period. FIG. 2A shows a single sensing location 100 from which data is recorded from each site 110 in the heart 200 corresponding to the respective position of the electrode. The data recording may be performed in advance of performance of the method, which can be applied to offline data.

The illustration in FIGS. 2A-2C, 4 and 7 is simplified for ease of understanding and does not show all of the data that may be output in embodiments. Similarly, the illustration of the heart is simplified for ease of understanding and representation. The illustrated heart 200 also includes illustration of the mitral valve 210, which is included to demonstrate that in selected embodiments the illustrated data may take into account non-tissue areas (where there would be no data or spurious data that embodiments may suppress or otherwise compensate for). The box and arrow around the sites 110 in FIG. 2A are present for illustration only, showing that the data corresponds to that shown on the right hand side of the Figure. The box and arrow are not part of the data displayed in embodiments.

In step 20, repetitive patterns of activation sites (RPAs) are identified from the recording data. Preferably this is performed using the STAR mapping algorithm discussed above. Here, multiple activations are recorded and the vector of activation for each activation at that recording site is calculated. Statistical methods are used to establish the predominant vectors of activation, and these can be subclassified by other features of activation (e.g. sequence of activation recorded by other electrophysiology catheters in the heart). Each resulting classified measurement of the predominant repetitive activation vector has a dataset associated with it, including features for example the variation of the vectors direction, frequency or conduction velocity and site where activation is earliest. These resulting sites are referred to as "repetitive pattern of activation" sites (RPAs). Methods other than STAR may be used to calculate RPAs, such as the classification of the vector gradient of activations across groups of electrodes on a mapping catheter.

For each identified repetitive pattern of activation:
i) step 30 identifies the earliest activating site 120 and a vector of activation 130 from the identified electrode activation sequences (FIG. 2A);
ii) step 40 traces a path 140 back from the earliest activating site 120 over a surface of the heart chamber, the surface being determined from the obtained data on the geometry of the heart, the path being cast as a ray over the surface of the heart chamber and guided by a vector that is opposite in direction to the vector of activation (FIG. 2A);
iii) step 50 calculates a statistical measure for said repetitive pattern of activation over said time period; and,
iv) step 60 outputs data identifying the repetitive pattern of activation including the earliest activating site and the path, the data varying the prominence of the repetitive pattern of activation and/or path and/or region in the vicinity of the path in dependence on the statistical measure (FIG. 2B).

The data output may be encoded/numeric so as to be able to be concisely transmitted or stored for later consumption. However, preferably the data is, or is transformed into, a visual representation, where the density, colour gradient or shading of an area indicates a measure of the statistical measure.

In one embodiment, each RPA is represented with a vector 130 starting from the earliest activating site 120 (leading electrode) toward to the dominant propagation direction over site of recording of the RPA. A back track region 150 is shown emanating from the tail of the represented vector arrow 130 following the path drawn, with the region of significance emanating from that line. The importance of any point in that region may depend on both the distance from the RPA and the lateral distance from the path, as well as on other statistical or tissue or electrogram properties. The final importance can be represented on a map. As shown on the illustrations, the significance may be shown by density of the shading of the backtrack region, coloring, or in some other manner. In the example of FIG. 2B, significance is shown by density of shading with 150A (most dense shading) being most significant, 150B next most significant and 150C (least dense shading) of lesser significance than 150A and 150B. A simplified example showing a single RPA is shown in FIG. 2C, which is a 2D rendering, though a 3D rendering could likewise be depicted in which the backtrack line 140 can be shown following a surface representation of the heart chamber, in which case it would appear to curve erratically across the particular surface of the heart it is following. The regions 150A, 150B and 150C can be signified in a 3D rendering by coloration, for instance, with region 150C being shown in yellow to signify the least relevant regions, progressing to green for the region 150B, namely, the for next most relevant region, and then to shades of blue with dark blue for the region 150A being most relevant region, as can be appreciated from the foregoing disclosure.

Figure 3:
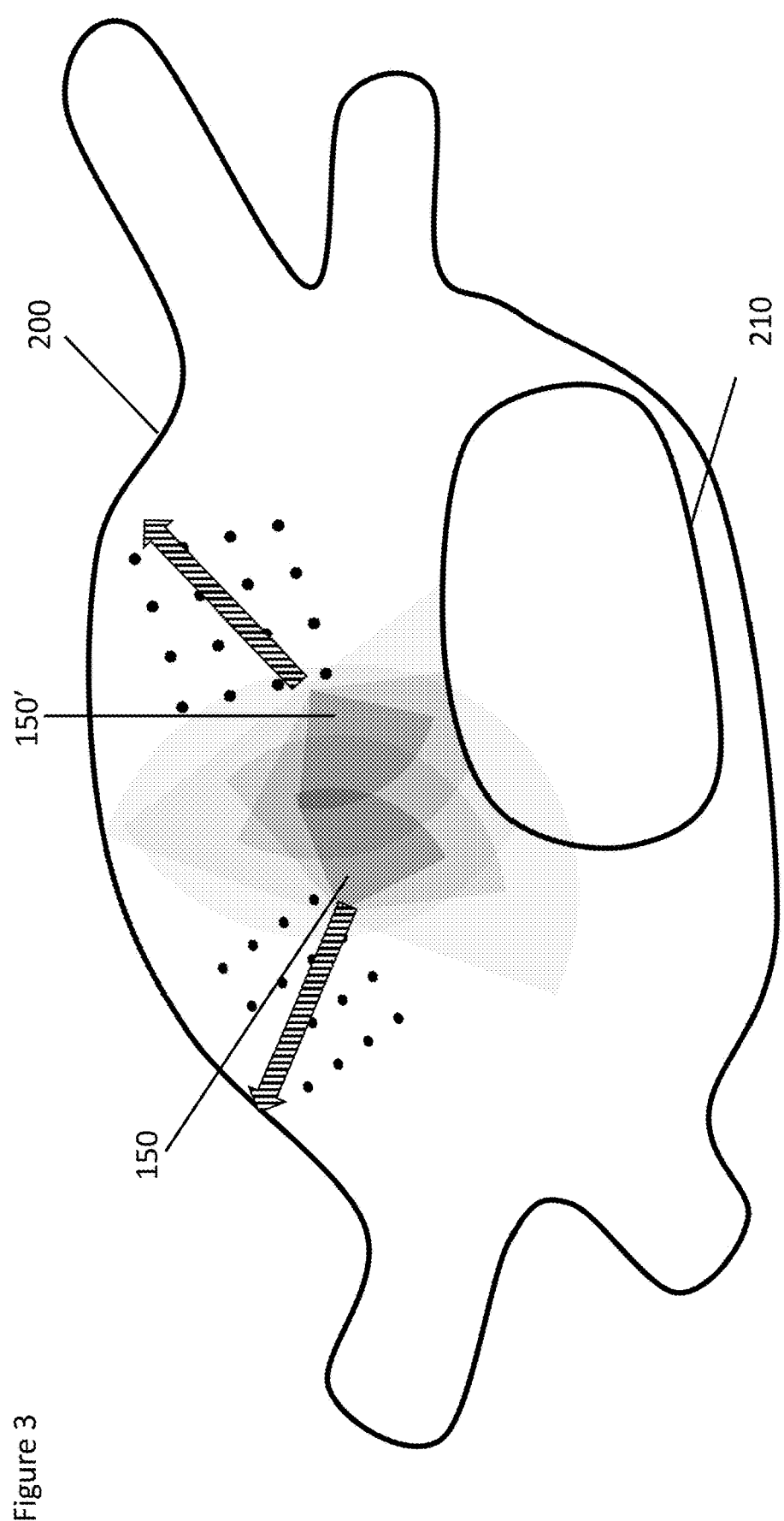
FIG. 3 is a schematic diagram showing data identifying two earliest activating sites and their interaction.

Multiple RPAs may be output, and the interaction of the backtrack regions may be additive as shown in overlapping of regions 150 and 150' in FIG. 3, where a darker region indicates the overlap of backtrack regions. This can be calculated by summative or additive calculations and normalization of the statistical importance metric. An example of multiple potential RPAs and backtrack interactions that may be output is shown in FIG. 3.

Figure 4:
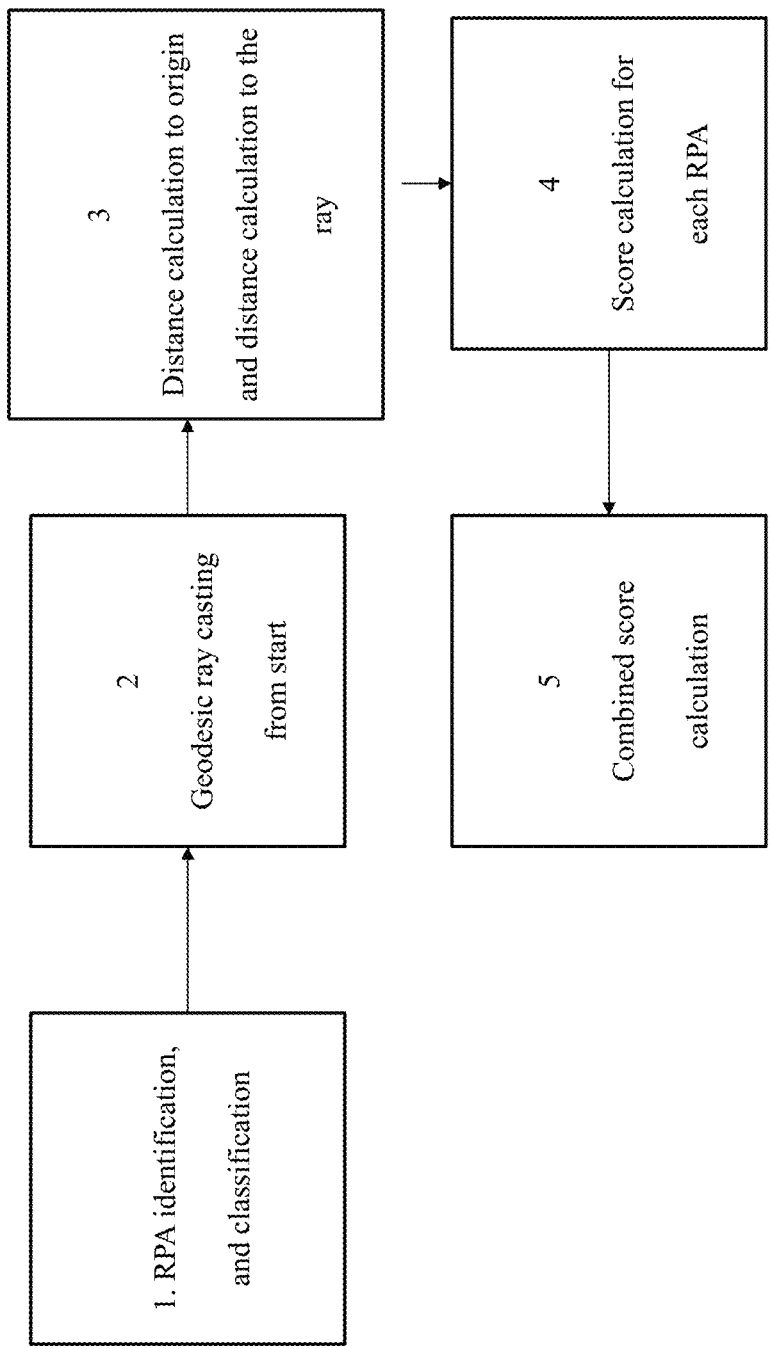
FIG. 4 is a schematic diagram showing aspects of processing performed in one embodiment; and, FIG. 5 is a schematic diagram illustrating an embodiment in which other data is incorporated into the data identifying a repetitive pattern of activation.

The following steps are then repeated for each RPA, as shown in FIG. 4.

2. Geodesic Ray Casting from Start:

The initial back tracking is performed by establishing the earliest activating site of activation for each RPA and a path leading back from this site in the opposite direction from the predominant vector of activation is established following a geodesic path. This is termed Geodesic Ray Casting. The geodesic path is following the curved surface of the atrial chamber, and the opposite direction is defined as the vector direction in the tangent plane of the origin position of the RPA vectors and formed an angle of 180 degrees. Preferably, the process stops once the Ray reaches a predetermined length, the greater the distance from the RPA the greater the uncertainty as to the relevance of that site to the RPA site, thus a distance of 1.5 cm from the RPA is used as a "cut off" beyond which the process stops.

3. Distance Calculation to Origin and Distance Calculation to Ray:

For each point on the chamber surface representation, two distances are calculated: the distance to the RPA earliest site of activation, and the distance to the ray. Thus for each point on the chamber surface there is a calculated distance to the RPA start point and to the Ray. The ratio of the two distances gives a measure of (sine) angle.

4. Score Calculation for Each RPA

Each point on the chamber surface is given a score relative to each RPA that takes into account both the distance and angle measures, for example, exponential penalties for deviations from 0 distance to origin and 0 angle multiplied together. Other penalties may be related to features of the RPA from which the score is derived, for example the variation in vector angles making up the RPA, the variation of cycle length or the absolute cycle lengths contributing to each RPA. Further additional modifying factors for each score can be provided from pre-acquired data, for example voltage maps acquired earlier in the procedure, sites of known prior ablation, anatomical data or data regarding anatomy or physiology acquired from mapping databases.

5. Combined Score Calculation

For each point on the geometry for which scores are calculated, the scores relative to multiplied RPAs are combined into a single score. For example the sum of the individual scores can be represented as an absolute value, or normalized to the maximum and minimum scores of all scores within the entire map. Another method is to normalize to local maximal or minima values considering all RPAs that contribute to an overlapping region as a local set of RPAs. A further adjustment may be made by providing a penalty or adjustment factor whereby scores are increased relative to how may RPAs contribute to each local set of RPAs, allowing points where more RPAs contribute to score calculation to have higher prominence or certainty than those where only a single RPA is contributary. These scores can be visualized as a color scheme that highlight the areas with highest scores for the potential sources.

The angle and distance measurement can be adjusted according to the data associated to the RPA statistics for the specificity and sensitivity of the potential sources of arrhythmia identification. For example, scores may be penalized for higher variations in direction, rate or activation sequences, or for the rate of RPA activation. These penalties may be applied in an absolute manner or normalized to data from all RPAs identified, for example back track score calculations from RPAs with a higher frequencies of activation may be given a higher priority than those from lower activation rates.

This procedure is carried out for every RPA, and for each point on the geometry the number of inclusion regions is recorded. Points that are included in the backtrack regions of multiple RPAs can be highlighted as regions of interest for further investigation.

Figure 5:
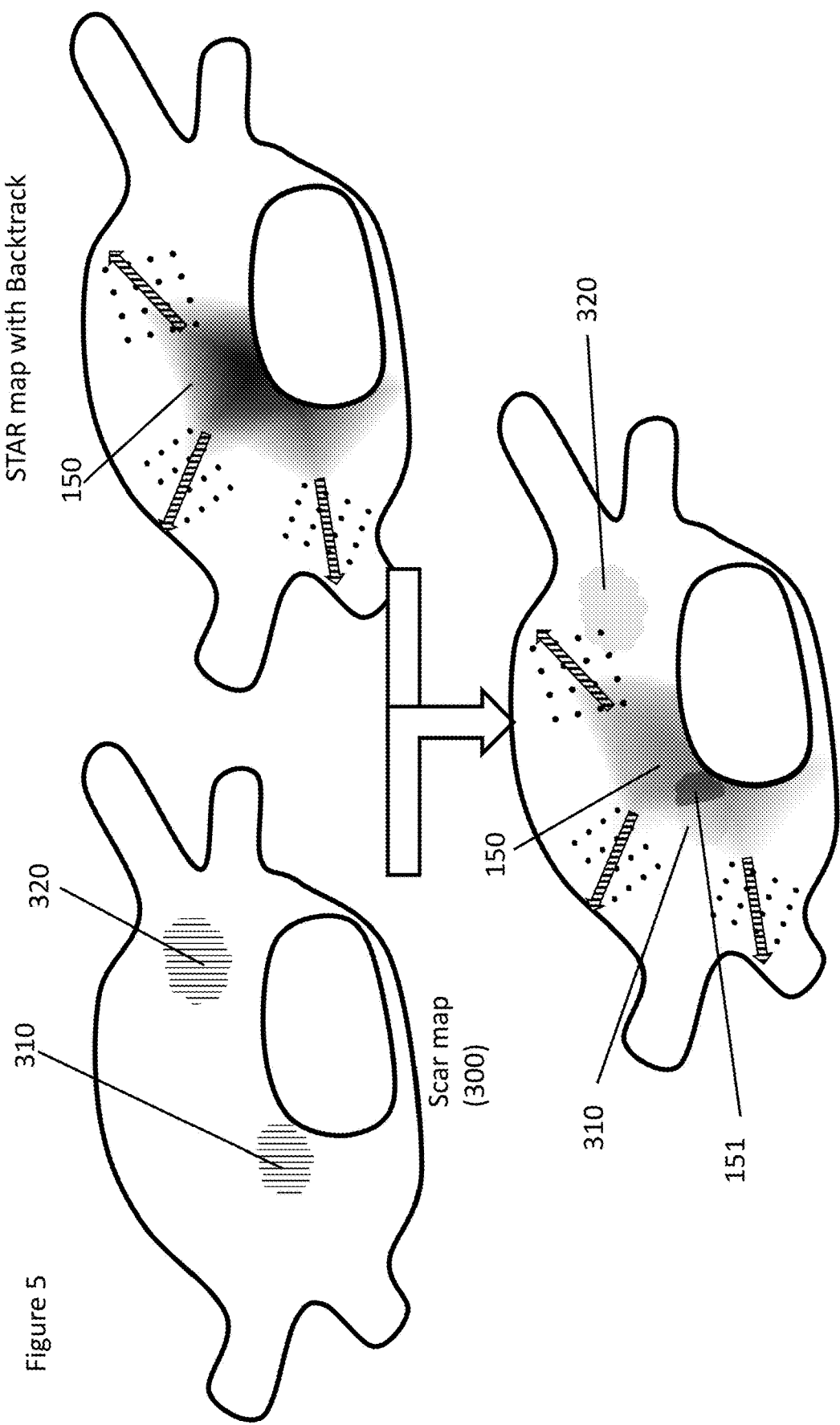

Other physiological, electrogram or external data may be integrated into the backtrack maps, and data from, for example a "scar map" either acquired through external imaging or during electroanatomical mapping, may be combined with the backtrack map to further influence the prominence of areas as shown in FIG. 5. In this example, the other data 300 concerns areas of scarring 310, 320 that has been identified separately but for the same heart 200. When calculating the backtrack region 150, preferred embodiments take into account the available other data and modify the calculated backtrack region and/or prominence of the region. In this example, scarring region 310 increases the prominence of display of the backtrack region 151. This may be incorporated into the calculation of the scores (for applying modifying the score of pixels or points identified to be at or close to scarring, for example in steps 4 and/or 5 above) or at an image level with pixel values and/or coloring being adjusted when there is overlap of the other data. The user interface may also allow a layered approach with the user having control to selectively turn one or more "other" data sources on or off and see the map with and without its effect.

It will be appreciated that the data produced may be stored in a data repository that may take various forms including a central or distributed file store, database (such as SQL or other relational or non-relational database types). It may be implemented using storage devices such as hard disks, random access memories, solid state disks or any other forms of storage media. It will also be appreciated that the processor discussed herein may represent a single processor or a collection of processors acting in a synchronised, semi-synchronised or asynchronous manner.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A computer implemented method in which a processor is configured by computer program code to identify one or more regions of a heart responsible for supporting or initiating abnormal heart rhythms when said computer program code is executed on a computer, the computer implemented method using electrogram data recorded from a plurality of electrodes on multipolar cardiac catheters obtained from a corresponding series of sensing locations on the heart over a recording time period, the method comprising the steps of:
   first obtaining data on geometry of the heart from which the electrogram data was recorded into a memory storage device;
   second identifying electrode activation sequences contributing over the recording time period to a repetitive pattern of activation from the electrogram data using code executing in the processor;
   third, for each repetitive pattern of activation, using further code executing in the processor to implement the following steps in order:
      i) identifying an earliest activating site and a vector of activation from the identified electrode activation sequences;
      ii) tracing a path back from the earliest activating site over a surface of a heart-chamber of the heart, the surface being determined from the obtained data on the geometry of the heart, the path being cast as a ray over the surface of the heart chamber and guided by a vector that is opposite in direction to the vector of activation;
      iii) calculating a statistical measure for said repetitive pattern of activation over said time period; and,
      iv) outputting data identifying the repetitive pattern of activation including the path, the data varying a prominence of the repetitive pattern of activation in dependence on the statistical measure, wherein the surface of the heart chamber is curved, and wherein tracing the path back from the earliest activating site comprises following a geodesic path along the curved surface of the heart chamber.

2. The method of claim 1, wherein the outputting step further comprises varying the prominence of the repetitive pattern of activation with respect to other repetitive patterns of activation.

3. The method of claim 1, wherein step iv) includes generating a visual representation of the surface of at least a region of the heart from which the electrogram data was recorded for output together with the data identifying the repetitive pattern of activation, the visual representation including a visual representation of the repetitive pattern of activation traversing the path along the surface.

4. The method of claim 3, wherein the statistical measure comprises frequency of repetition over the time period.

5. The method of claim 3, wherein the statistical measure comprises consistency of activations over the time period in the direction of activation.

6. The method of claim 3, wherein the visual representation of the repetitive pattern of activation is varied by one of more of width of the path, color of the path, size and/or type of an indicator pointing in the direction of activation.

7. The method of claim 1, further comprising:
a) determining, for at least a selected repetitive pattern of action, for a point on said surface:
  a distance across the surface from the point to the earliest point of activation for the repetitive pattern of activation;
  a distance from the point to the nearest point on the path;
  an angle between the earliest point of activation, the point and the nearest point on the path;
b) determining a score for the point in dependence on the distances and the angle;
c) varying the prominence of the point in the data that is output in dependence on the score.

8. The method of claim 7, wherein the prominence of the point is varied relative to a fixed scoring scale.

9. The method of claim 7, wherein the prominence of the point is varied relative to score of other points.

10. The method of claim 7, further comprising performing steps a-c for all points on said surface.

11. The method of claim 7, further comprising upon there being multiple repetitive patterns of activation, calculating a combined score for each point, the combined score being calculated in dependence on the scores for the respective point for the individual repetitive patterns of activation, step c) being performed in dependence on the combined score.

12. The method of claim 11, the step of calculating the combined score comprising calculating a normalized score.

13. The method of claim 11, the step of calculating the combined score comprising applying a penalty factor whereby scores are increased relative to how many repetitive patterns of activation the point contributes to.

14. The method of claim 7, wherein step a) further includes modifying one or more of the angle and distance measurement according to the statistical measure for the repetitive pattern of activation.

15. The method of claim 7, wherein step a) further accessing external data on the heart and modifying one or more of the angle and distance measurement or score according to the external data.

16. The method of claim 15, wherein the external data includes voltage maps acquired earlier in a procedure, sites of known prior ablation, anatomical data or data regarding anatomy or physiology acquired from mapping databases.

17. The method of claim 7, further comprising highlighting points where paths of repetitive patterns of activation intersect.

18. The method of claim 1, wherein step vi includes outputting data identifying the earliest activating site.

19. A computer system for identifying one or more regions of a heart responsible for supporting or initiating abnormal heart rhythms using electrogram data recorded from a plurality of electrodes on multipolar cardiac catheters obtained from a corresponding series of sensing locations on the heart over a recording time period, the system comprising:
a processor;
a first memory for storing received electrogram data; and
a second memory having program code stored therein that when executed by the processor causes the system to:
obtain data on the geometry of the heart from which the electrogram data was recorded;
identify electrode activation sequences contributing over the recording time period to a repetitive pattern of activation from the electrogram data;
for each repetitive pattern of activation, in order:
  i) identify the earliest activating site and a vector of activation from the identified electrode activation sequences;
  ii) trace a path back from the earliest activating site over a surface of the heart chamber, the surface being determined from the obtained data on the geometry of the heart, the path being cast as a ray over the surface of the heart chamber and guided by a vector that is opposite in direction to the vector of activation;
  iii) calculate a statistical measure for said repetitive pattern of activation over said time period; and,
  iv) output, via an output device, data identifying the repetitive pattern of activation including the path, the data varying the prominence of the repetitive pattern of activation in dependence on the statistical measure.

20. A computer implemented method in which a processor is configured by computer program code to identify one or more regions of a heart responsible for supporting or initiating abnormal heart rhythms when said computer program code is executed on a computer, the computer implemented method using electrogram data recorded from a plurality of electrodes on multipolar cardiac catheters obtained from a corresponding series of sensing locations on the heart over a recording time period, the method comprising the steps of:
obtaining data on the geometry of the heart from which the electrogram data was recorded;
identifying electrode activation sequences contributing over the recording time period to a repetitive pattern of activation from the electrogram data;
for each repetitive pattern of activation, in order:
  i) identifying the earliest activating site and a vector of activation from the identified electrode activation sequences;
  ii) tracing a path back from the earliest activating site over a surface of the heart chamber, the surface being determined from the obtained data on the geometry of the heart, the path being cast as a ray over the surface of the heart chamber and guided by a vector that is opposite in direction to the vector of activation;

iii) determining, for at least a subset of points on said surface:
  a distance across the surface from the point to the earliest point of activation for the repetitive pattern of activation;
  a distance from the point to the nearest point on the path;
  an angle between the earliest point of activation, the point and the nearest point on the path;
  a score for the point in dependence on the distances and the angle;
iv) calculating a statistical measure for said repetitive pattern of activation over said time period; and,
v) outputting data identifying the repetitive pattern of activation including the path including generating a visual representation of the surface of at least a region of the heart from which the electrogram data was recorded, the visual representation including a visual representation of the repetitive pattern of activation traversing the path along the surface, the visual representation varying the visual prominence of the repetitive pattern of activation in dependence on the statistical measure, and a visual representation of at least a subset of the points scored in step iii), the visual representation of each point being dependent on its respective score.

* * * * *